Oct. 11, 1932.    E. J. LARSEN    1,881,706

APPARATUS FOR HANDLING ARTICLES

Filed Feb. 5, 1931

INVENTOR
E. J. LARSEN
BY
E. R. Nowlan
ATTORNEY

Patented Oct. 11, 1932

1,881,706

UNITED STATES PATENT OFFICE

ELMER J. LARSEN, OF BALTIMORE, MARYLAND, ASSIGNOR TO WESTERN ELECTRIC COMPANY, INCORPORATED, OF NEW YORK, N. Y., A CORPORATION OF NEW YORK

APPARATUS FOR HANDLING ARTICLES

Application filed February 5, 1931. Serial No. 513,483.

This invention relates to apparatus for handling articles and more particularly to apparatus for handling cylindrical articles such as spools.

An object of the invention is to provide an apparatus for handling articles which will be compact and sturdy in construction and convenient and efficient in operation.

The invention comprises a grapple wherein a pair of pivoted arms controlled by oppositely threaded members may be moved to engage with a wire spool segmental members pivotally secured to the ends of the arms. The segmental members have formed flanges for receiving and centering the spool therebetween and closely engaging the heads thereof.

Figure 1:
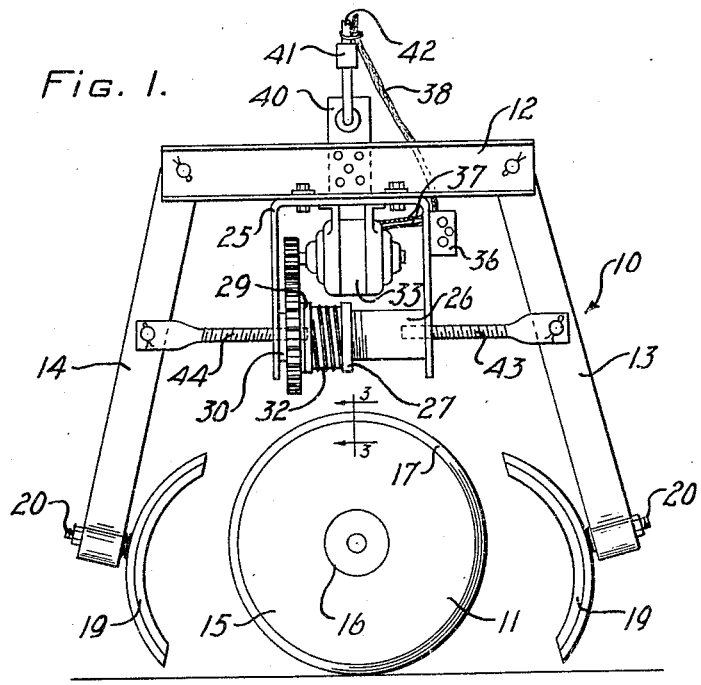
Figure 2:
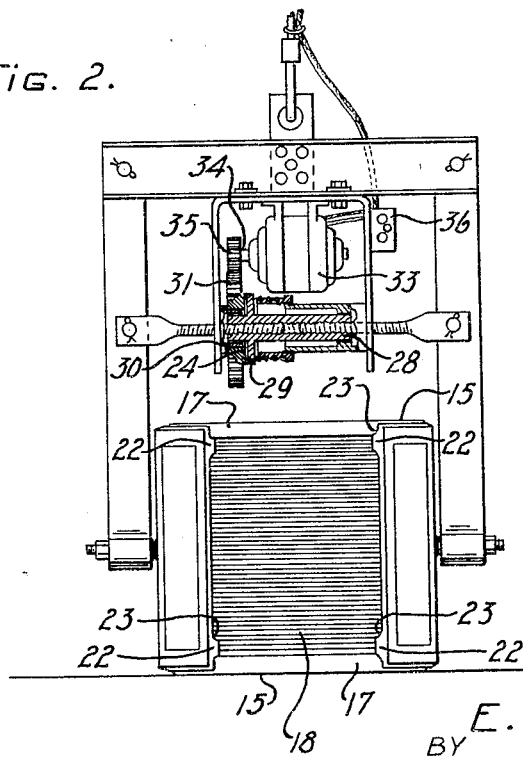
Figure 3:
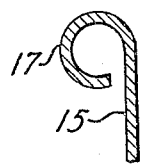

The invention will be more clearly understood by referring to the following detailed description, read in conjunction with the accompanying drawing forming a part thereof, in which Fig. 1 is an elevation of the device in expanded position preparatory to engaging the spool shown;

Fig. 2 is an elevational view showing the segmental members in retracted position preparatory to releasing the spool shown after operation, and Fig. 3 is an enlarged fragmentary section taken on the line 3—3 of Fig. 1, showing the character of the conventional bead-rim.

Referring to the drawing, wherein similar parts are indicated in the several views by identical reference numerals, a grapple, generally designated by the numeral 10, for engaging a spool 11 includes a top channelled cross bar member 12, from the opposite ends of which are pivotally suspended rigid arms 13 and 14. The spool or reel 11 is of the conventional type used for receiving wire, and consists of oppositely disposed circular metallic heads 15—15, connected by a cylindrical drum 16. The reel heads are provided with rolled edges or beaded rims 17—17 which are turned outwardly (Fig. 3) to strengthen the reel without interfering with the deposition of wire 18 thereon between the heads. In Fig. 2 the reel is shown filled with the wire 18.

A pair of curved or segmental carrying plates 19—19 are provided, on the convex sides thereof, with centrally disposed pins 20—20 respectively, which are pivotally mounted in the lower extremities of the rigid arms 13 and 14. Provision of these plates constitutes an important element of the invention. It will be understood from the drawing (Figs. 1 and 2) that the plates may substantially correspond in length to the over-all length of the reel 11, that their curvature is preferably the same as the peripheral curvature of the heads 15—15, and that the width of each at its concave face may be equivalent to one-fourth of the circumference of the reel heads. Adjacent each longitudinal edge the plates are provided, upon the concave surfaces thereof, with spaced flanges 22—22, which extend longitudinally the full length thereof, the outer edge of each flange being formed with a groove 23 which is curved to correspond with the cross sectional curvature of the beaded rims 17.

An apparatus for operating the arms 13 and 14 is mounted upon an inverted U-shaped frame member 25, which may be bolted or otherwise suitably secured to the under-surface of the cross bar 12 midway between the arms 13 and 14. A cylindrical shell or housing 26 is secured to the inner surface of one side of the frame member and is exteriorly threaded at one end to receive an internally threaded collar 27. An internally threaded elongated cylindrical member 28 (Fig. 2) is disposed axially within the shell 26 and projects at one end from the shell, being there provided with a flange 29. A stationary collar 30 is secured to the inner surface of the other side of the U-shaped frame member to constitute a bearing for a gear 31 which is axially aligned with the internally threaded member 28. A coil spring 32 is mounted upon the exterior surface of the internally threaded collar 27 and is compressed between the member 27 and the flange 29 for the purpose of holding the flange 29 against a lateral projection 24 of the gear 31 as a slip clutch, the pressure of the flange 29 upon the projection 24 of the gear being regulated by turning the member 27 upon the threaded end of the shell 26 to alter the tension in the spring 32. A motor 33, bolted or otherwise suitably secured between the side members of the U-shaped frame 25 is provided with a drive shaft 34 upon which is secured a spur gear 35 which meshes with the gear 31. A three-button switch 36 for controlling the motor 33 in forward, reverse and stop operation is mounted upon the exterior of the frame member and is electrically connected by means of conductors 37 to the motor 33 and by conductors 38 to any suitable source of electrical energy (not shown). A perforated plate 40 is rigidly secured to the cross bar 12 in the center thereof and a clevis 41 connected to a lifting cable 42 is engaged therein whereby, it will be understood, the grapple may be connected to any suitable hoist (not shown) for transportation purposes.

To operate the plates 19—19 from the clutch mechanism, to handle the reel, a rod 43, which is externally threaded in a left-hand direction, is pivotally secured at one end of the arm 13; and a rod 44, externally threaded in a right-hand direction, is pivotally secured to the arm 14. The rods 43 and 44 are so positioned as to be axially aligned with the collar 30, gear 31, cylindrical member 28 and shell 26 when the arms 14 and 15 are disposed at right angles to the cross bar 12, i. e., when they are in retracted positions. These rods extend through suitable axially aligned apertures in the sides of the U-shaped frame member, and within the internally threaded member 28, so that when the member 29 is rotated, the members will move away from or toward each other in unison.

Some advantages of the invention may be brought out in connection with its use as an adjunct to a wire drawing machine whereof the take-up reel 11 is in the position shown in Fig. 1. In such machines the take-up reel rotates upon a horizontal axis and when full may be discharged by stopping the machine and moving the reel axially of its support and depositing it upon the ground in the horizontal position shown in Fig. 1 in front of the wire drawing machine. Reels of the type shown, when full, weigh several hundred pounds and consequently can be manually handled only with difficulty. For the purpose of conserving space in storing the loaded reel, and to protect the beaded rims 17 thereof in order to retain the balance in the reel, it is desirable that it be stacked upon end rather than with its axis disposed longitudinally. The grapple 10 is therefore hoisted into the position shown in Fig. 1 with respect to the discharged reel, with the plates 19—19 expanded and longitudinally aligned with the reel. The motor 33 is then actuated to drive the gears 31 and 35, thus rotating the internally threaded member 28 with the result that the threaded rods 43 and 44 are drawn toward each other, and the segmental plates 19—19 drawn into engagement with the reel. Upon such engagement, it will be noted, as shown in Fig. 2, that the flanges 22—22 of each plate 19 are positioned on the inside of the rolled rims 17—17 at opposite ends of the spool, the groove 23 of each flange corresponding with the curved surface of the rim to accurately center and hold the reel between the segmental members when the rods are drawn inwardly, to complete the movement. As soon as the clutch starts to slip, indicating that the rims are engaged in the grooves, the grapple with its load is hoisted and transferred, whereupon the segmental members may be rotated, manually or otherwise, upon the pins 20—20 so that the axis of the reel becomes vertically disposed. The grapple is then lowered to deposit the reel in the desired storage location, whereupon the motor 33 is actuated in a reverse direction, moving the segmental plates away from the reel and causing them to resume the expanded position. The grapple may then be carried back to the loading station, and the segmental plates rotated to horizontal position preparatory to engaging another reel. The apparatus described is particularly useful in handling and securely holding heavy reels, whether loaded or unloaded during transit; the segmental plates which closely engage the reel over a large portion of its periphery, or approximately one-half thereof, and the grooved portions of the plates cooperating to prevent the reel from dropping or slipping. It will be apparent that by providing the flanges 22 which project from the concave surfaces of the segmental plates a loaded reel may be securely held therebetween without damage to wire stored thereon, since the beaded rims 17 project above the wire and engage in the grooves of the plates thereby spacing the plates and the wire apart.

It will be understood that although the disclosed clutch mechanism has been found workable in the present embodiment, yet it represents but one of numerous conventional forms which may be used if desired, it being merely essential that some type of clutch be employed between the motor and the depending arms 13 and 14 operated thereby for preventing injury to the mechanism when the plates 19 are closely engaged with the reel and before the motor has ceased operating in one direction. It will also be apparent that in lieu of a reversible motor, a reversing clutch mechanism might be employed instead of the clutch desired, in which case a motor capable of operating in only one direction might be employed.

It will be understood that the embodiment of the invention herein described and illustrated is merely a convenient and useful form of the invention which is capable of other modifications without departing from the spirit and scope of the invention as defined in the appended claims.

What is claimed is:

1. In a grapple for handling reels, an arm, another arm movable toward and away from the first arm, and a segmental plate pivotally mounted on each arm for closely engaging a reel along a substantial portion of the periphery and the inner surfaces of the heads thereof when the reel is between the arm and the second arm moved toward the first arm, and motor driven means including a clutch for moving said segmental plates into and out of engagement with the reel.

2. In a grapple for handling reels, a pair of oppositely disposed segmental plates, a groove in each plate for receiving a head of the reel, and motor driven means including a clutch for moving the plates toward each other to engage the reel therebetween.

3. In a grapple for handling bead rimmed reels, a pair of oppositely disposed segmental plates, a flange at opposite ends of each plate having a configuration to conform with the configuration of the reel rims, and having portions engageable with inner faces of the reel heads, and motor driven means including a slip clutch for moving the plates toward each other to engage the reel therebetween.

4. In a grapple for handling reels, a pair of arms, a segmental plate pivotally mounted at the convex surface thereof to each arm for engaging a reel positioned between the arms and having a flange extending across the concave surface at each end thereof engageable with the rims and inner surfaces of the reel heads, each flange having a longitudinally extending curved groove for centering the reel between the plates, and motor driven means carried by said grapple for moving the arms toward the reel.

5. In a grapple for handling bead rimmed reels, a top horizontal cross bar, a pair of arms pivotally depending from opposite ends of the bar, a segmental plate pivotally secured at its central point to the inner surface of one of the arms at the bottom thereof, a similar plate similarly mounted on the inner surface of the other arm, a concave surface thereof being diametrically opposed to the concave surface of the other segmental plate and the curvature of the plates corresponding to the peripheral curvature of the head of a reel to be handled to engage the reel when placed between the plates, each plate being of a length substantially equal to the length of the reel, a threaded rod pivotally secured to one arm between the extremities thereof, an oppositely threaded rod similarly secured to the other arm, a rotatable threaded nut engaging both rods to move them in opposite directions when it rotates in one direction, reversible means for rotating the nut to cause the plates to move with respect to the reel, and a flange having a longitudinally extending curved groove corresponding to the lateral curvature of the bead rim, the flange extending across the concave surface of each plate at each end thereof for receiving the rims and centering the reel head between the plates when the plates are moved toward the reel.

6. In a grapple for handling bead rimmed reels, a pair of oppositely disposed segmental plates, a flange at opposite ends of each plate having longitudinal and transverse configurations to conform with the configuration of the reel rims, and motor driven means including a slip clutch for moving the plates toward each other to engage the reel therebetween, said slip clutch adapted to prevent the application of harmful or destructive pressures to said reel rims.

7. In a grapple for handling bead rimmed reels, a pair of oppositely disposed segmental plates, a flange at opposite ends of each plate having a configuration to conform with the configuration of the reel rims, and having portions engageable with the inner faces of the reel heads, and motor driven means including a slip clutch for moving the plates toward each other to engage the reel therebetween, said slip clutch adapted to prevent injury to the driving mechanism when the reel rims prevent further movement of the plates toward each other.

8. In a grapple for handling reels, an arm, another arm movable toward and away from the first arm, a segmental plate pivotally mounted on each arm for closely engaging a reel along a substantial portion of the periphery and inner faces of the heads thereof when the reel is between the arms and the second arm is moved toward the first arm, and motor driven means including a slip clutch adapted to prevent further movement of the arm when the tension between the arms increases to a predetermined amount.

9. In a grapple for handling reels, a member, a pair of movable arms pivotally supported by the member, oppositely threaded rods pivotally attached to the arms intermediate the ends thereof, rotatable means having portions oppositely internally threaded engaging the threaded rods, means for actuating the rotatable means to draw the movable arms toward and away from each other, and load engaging members carried by said arms.

10. In a grapple for handling reels, a pair of arms movable toward and away from each other, load engaging means carried by the arms, oppositely threaded rods secured to the arms, oppositely internally threaded rotatable means engaging the threaded rods, and means for rotating the internally threaded means to move the arms.

11. In a grapple for handling reels, a pair of arms movable toward and away from each other, oppositely threaded rods secured to the rods, an internally threaded rotatable member engaging the threaded rods and provided with a flange, a rotatable gear, a stationary member surrounding the rotatable member, and resilient means carried by the stationary member for urging the flange into engagement with the gear.

In witness whereof, I hereunto subscribe my name this 20th day of January, A. D. 1931.

ELMER J. LARSEN.